United States Patent [19]

Brennen

[11] Patent Number: 5,355,295
[45] Date of Patent: Oct. 11, 1994

[54] SERIES-PARALLEL ACTIVE POWER LINE CONDITIONER UTILIZING TEMPORARY LINK ENERGY BOOSTING FOR ENHANCED PEAK VOLTAGE REGULATION CAPABILITY

[75] Inventor: Michael B. Brennen, Pittsburgh, Pa.

[73] Assignee: Westinghouse Electric Corporation, Pittsburgh, Pa.

[21] Appl. No.: 108,262

[22] Filed: Aug. 19, 1993

[51] Int. Cl.$^5$ .................. H02M 1/12; H02M 1/14
[52] U.S. Cl. .................................. 363/40; 363/71; 363/98; 323/259; 323/344; 323/207
[58] Field of Search ..................... 363/39, 40, 71; 323/259, 344, 207

[56] References Cited

U.S. PATENT DOCUMENTS 3,825,814 7/1974 Pelly .
3,825,815 7/1974 Gyugyi et al. ............... 321/9 A
4,241,395 12/1980 Stacey et al. .................. 363/39
4,651,265 3/1987 Stacey et al. .................. 363/35

Primary Examiner—Emanuel T. Voeltz

[57] ABSTRACT

A series-parallel active power line conditioner is provide having improved peak voltage regulation capability when compared with the prior art. The DC energy level in the DC link between the series and parallel inverters is temporarily increased when the AC input voltage is not within the linear regulation range of the active power line conditioner. To effect this energy boosting function, control circuitry first determines the amount by which the average value of the AC input voltage is without the linear regulation range of the active power line conditioner. This information is then utilized to control the parallel inverter such that the DC energy level in the link is proportionally increased. A preselected maximum DC energy level is preferably chosen such that excessive AC input voltage variations will not cause further increases in the DC energy level. In presently preferred embodiments, this maximum DC energy level is twice the level nominally maintained when the AC input voltages fall within the sinusoidal regulation range of the active power line conditioner.

9 Claims, 4 Drawing Sheets

SERIES-PARALLEL ACTIVE POWER LINE CONDITIONER UTILIZING TEMPORARY LINK ENERGY BOOSTING FOR ENHANCED PEAK VOLTAGE REGULATION CAPABILITY

BACKGROUND OF THE INVENTION

1. Field of the Invention

The present invention relates to active power line conditioners which are utilized to regulate the quality of electrical energy delivered from an electrical energy source to an electrical load. More particularly, the invention relates to a series-parallel active power line conditioner (APLC) which has enhanced peak voltage regulation capability by functioning to temporarily increase DC link energy during excessive variations of the AC line voltage.

2. Description of the Prior Art

Electric supply networks are increasingly being exposed to the consequences of nonlinear loads, such as data processing equipment, numerical controlled machines, variable speed motor drives, robotics, medical apparatus and communication equipment. Such loads draw nonlinear pulse-like currents instead of sinusoidal currents drawn by linear loads (i.e., resistors, inductors and capacitors). These nonlinear currents flow through the source impedance of the electrical energy source, thus causing distortion of the AC line voltage.

This voltage distortion may produce a number of undesired effects. For example, sensitive loads connected to the network may experience operational difficulties. Additionally, the RMS current supplied by the electrical energy source will generally increase due to the presence of harmonics in the pulse-like currents. These harmonic currents may significantly increase $I^2R$ losses in interposing transformers.

Another problem which may have significant effects on many types of electrical equipment is the occurrence of temporary sags in the AC supply voltage. For example, many types of electrical equipment utilize a power supply input stage which converts the AC line voltage to DC voltage via a full wave rectifier connected across one or more large filter capacitors. In normal operation, the filter capacitor recharges with each peak of the rectified line voltage. It is only during this peak that the load is actually drawing current from the electrical supply network. When the rectified line voltage is lower than the voltage level on the filter capacitors, the rectifier diodes will prevent current from flowing. If, however, the AC line voltage does not maintain an adequate peak-to-peak level, these filter capacitors will not be able to maintain their required peak charge levels. As a result, operation of the associated electrical equipment may be affected.

The effects of many of these problems can be mitigated through the use of power electronic devices known as active power line conditioners. Such devices typically comprise one or two switching inverters arranged in a series, parallel, or series-parallel configuration. The inverters are controlled (generally by pulse width modulation (PWM) techniques) to effect a flow of current between a DC energy storage element and the AC supply lines to which they are connected. Such devices are shown and described in U.S. Pat. Nos. 4,651,265 and 3,825,815, which are incorporated herein by reference.

When a single inverter is used, this current may consist of the harmonic and ripple currents required by the load. In a series-parallel configuration, two inverters are arranged to share a common DC link. In this arrangement, the inverters may cooperate to effect a transfer of real power between the source or load and the DC link. This may be helpful to insure that the load continually sees ideal current and voltage characteristics.

The series inverter in a series-parallel active power line conditioner is typically coupled to the AC supply line via a coupling transformer. The series inverter applies a voltage of selected magnitude and polarity to the secondary winding of the transformer, which produces an AC regulation voltage on the primary winding of the transformer. This AC regulation voltage bucks or boosts (i.e., is added to or is subtracted from) the AC supply voltage to maintain the AC output voltage seen by the load at a regulated nominal value. The parallel inverter may operate as an active filter to supply real and reactive currents to the load as needed as well as cooperating with the series inverter to effect real power transfer.

The voltage regulation capability of a series-parallel active power line conditioner is given in terms of a rated buck/boost voltage range. If the line voltage magnitude stays within the rated buck/boost range, the output voltage stays essentially constant and sinusoidal at the nominal value. Typically, the rated buck/boost range of an active power line conditioner is expressed as a percentage of the nominal output voltage. Generally, this buck/boost range is selected to fall between $\pm 10\%$ to $\pm 25\%$ of the nominal output voltage. (The voltage buck/boost range tends to be symmetrical due to symmetry of the series inverter power circuit.)

When the supply voltage sinks below the rated boost range of the active power line conditioner, however, the output voltage tends to also be dragged down. Thus, the line voltage seen by the various loads connected to the electrical power network will fall below the nominal value. As a result, the quality of power delivered to these loads is no longer insured. This is particularly true in the case of loads having rectified capacitive inputs, since the filter capacitors may not be able to obtain their peak charge level. Additionally, transient voltage sags or surges may occasionally exceed the selected rating of the series voltage regulator.

In order to provide the greatest assurance of power quality to loads supported by the APLC, it is therefore desirable for the device to have as large buck/boost regulation range as is practical. The weight and cost, however, associated with the magnitude of voltage regulation capability is proportional to this regulation range. As such, an active power line conditioner with a higher regulation range would be expected to be larger and more expensive than a similar device with a smaller regulation range. This may tend to negatively affect the commercial viability of such equipment. Additionally, the installation of a larger coupling transformer to support excessive input voltage sags would have double iron losses that would adversely effect the overall efficiency.

SUMMARY OF THE INVENTION

The present invention provides a series-parallel active power line conditioner which has improved peak voltage regulation capability when compared with the prior art. The invention recognizes that the coupling transformer of the series inverter, which can support a sinusoidal voltage of a known peak value, can support higher peaks for short periods. For many contemplated loads this transient peak provided will be sufficient. For example, the peaking but nonsinusoidal waveform may maintain filter capacitors in rectified capacitive power supplies at their peak charge level. Transient sags or spikes can also be compensated to a greater degree than would be achieved with a similarly-sized prior art device.

In presently preferred embodiments, these results may be attained by a device which utilizes an easily implemented control function. The control function involves temporarily increasing the DC energy level in the DC link between the series and parallel inverters when the AC input voltage is not within the sinusoidal regulation range of the active power line conditioner. To effect energy boosting, circuitry may be provided to first determine the amount by which the average value of the AC input voltage is not within this sinusoidal regulation range. This information may then be utilized to control the parallel inverter to proportionally increase the DC energy level in the link. A preselected maximum DC energy level is preferably chosen such that excessive AC input voltage variations will not cause further increases in the DC energy level. In presently preferred embodiments, this maximum DC energy level is twice the level nominally maintained in the link.

DETAILED DESCRIPTION OF PRESENTLY PREFERRED EMBODIMENTS

Figure 1:
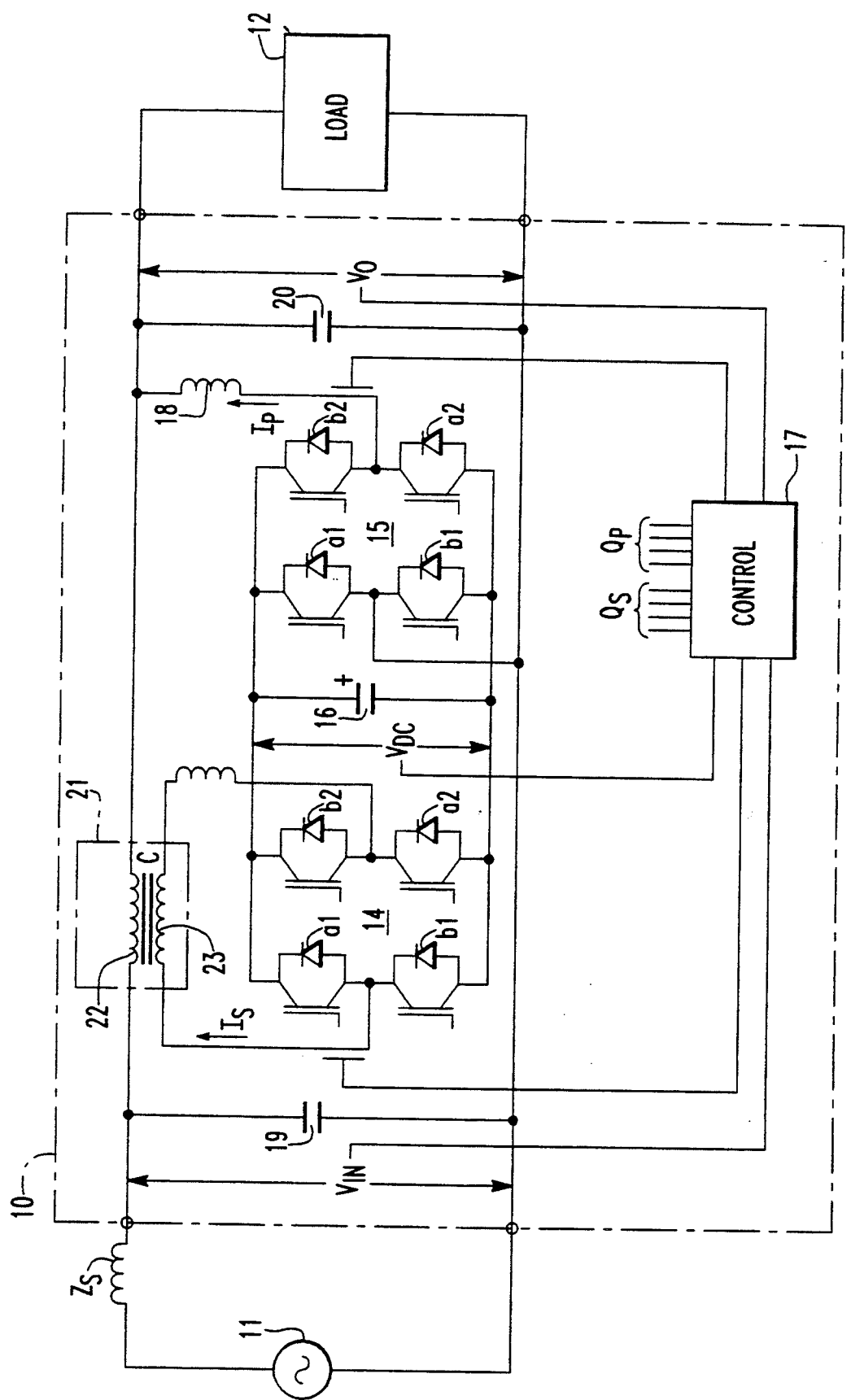
FIG. 1 is a schematic representation of an improved active power line conditioner constructed in accordance with the present invention.

FIG. 1 illustrates an active power line conditioner (APLC) 10 constructed in accordance with the invention. As shown, APLC 10 is connected interposing an electrical energy source 11 supplying an electrical load 12. Electrical energy source 11 includes source impedance $Z_s$, which is primarily inductive in nature. APLC 10 is a series-parallel device having a series inverter 14 and a parallel inverter 15 interconnected by a shared DC link. A storage capacitor 16 is connected across the DC terminals of inverters 14 and 15 and functions as a DC energy storage element. Instead of capacitor 16, an inductor may also be used for this purpose. It is desirable to maintain the voltage across capacitor 16 at an essentially constant nominal value except as increased according to the teachings of the present invention.

Inverters 14 and 15 each include two pairs of switching devices a1,a2 and b1,b2 which are operated in a complementary manner by control 17. Control 17 receives inputs from appropriate sensors within APLC 10 which may provide information regarding the following: AC input voltage $V_{in}$, AC output voltage $V_o$, DC link voltage $V_{DC}$, AC series inverter current $I_s$ and AC parallel inverter current $I_p$. Based on this information, control 17 develops appropriate gating signals (respectively denominated as $Q_s$ and $Q_p$) to deliver regulated power to load 12 at fundamental frequency. Preferably, control 17 operates switches a1,a2 and b1,b2 according to PWM techniques.

Series inverter 14 is coupled in series with electrical energy source 11 to apply an AC regulation voltage to AC input voltage $V_{in}$ in the proper phase and magnitude such that AC output voltage $V_o$ is regulated. Parallel inverter 15 (which here includes an inductor 18) is generally connected across load 12 to source or sink line current as necessary to provide harmonic currents and ripple filtering. In order that parallel inverter 15 will be able to easily source or sink line current as desired, the DC voltage $V_{DC}$ across capacitor 16 should nominally be maintained at a level slightly higher than the nominal value of the AC output voltage $V_o$. Because DC voltage $V_{DC}$ may otherwise tend to be depleted due to switching and conduction losses within APLC 10, parallel inverter 15 is also controlled to draw an appropriate amount of real power from the AC supply line. Preferably, the link control has a relatively slow response to avoid interaction between series inverter 14 and parallel inverter 15. Capacitors 19 and 20 are provided to filter switching harmonics generated by the switching action of inverters 14 and 15, respectively.

Series inverter 14 provides the AC regulation voltage for buck/boost regulation of the AC line voltage via coupling transformer 21. Transformer 21 includes a first, or primary, winding 22 which is serially connected in the AC supply line between source 11 and load 12. A second, or secondary, winding 23 of transformer 21 is connected across AC terminals of series inverter 14. Transformer 21 has a magnetically permeable core C of preselected characteristics and configuration.

In accordance with the prior art, it was considered necessary for the AC regulation voltage which is provided to either buck or boost AC input voltage $V_{in}$ to remain sinusoidal throughout the rated regulation range off the active power line conditioner. This could result in peak regulated voltage levels falling below desired levels if the AC input voltage $V_{in}$ sagged below the rated sinusoidal regulation range. For example, consider a prior art active power line conditioner rated to provide buck or boost of $\pm 20\%$ for a nominal line voltage of 120 volts. In this case, transformer 21 would be configured to provide a maximum sinusoidal voltage of voltage $V_o$ would remain at 120 volts. If, however, 24 volts across primary winding 22. Thus, for values of $V_{in}$ as low as 96 volts, the value of the AC output voltage $V_o$ would remain at 120 volts. If, however, according to devices of the prior art, the value of the AC input voltage $V_{in}$ falls below the sinusoidal regulation range of the equipment, the AC output voltage $V_o$ will also sag with a value equal to the sagging $V_{in}$ plus the maximum voltage provided across primary winding 22. In the above example, for instance, if the AC input voltage drops to a peak level 80 volts, $V_o$ will be equal to this 80 volts plus the 24 volts provided across primary winding 22, for a total of 104 volts.

The invention utilizes selected manipulation of the volt-second characteristic of transformer 21 to achieve higher peak voltage levels. The volt-second characteristic is a quality of a transformer defined by the number of windings, core size and configuration, etc. The volt-second characteristic states that a sinusoidal voltage of a particular peak amplitude may be maintained at a certain frequency of interest. If the frequency is lowered, this peak sinusoidal amplitude will decrease. Conversely, however, if the frequency is increased, the peak sinusoidal amplitude will also increase. For example, if a certain sinusoidal voltage having a peak value $V_{peak}$ may be achieved at 60 hertz, a sinusoidal voltage peaking at $2 * V_{peak}$ may be achieved if the frequency is increased to 120 hertz. This implies, according to the invention, that larger peak voltages may be achieved at the lower frequency for a portion of the voltage half cycle. Although the sinusoidal waveform shape of the output voltage is lost, the peak levels required by many of the loads to which the device is attached may be maintained. Thus, the present invention manipulates the volt-second capability of transformer 21 to replace the sinusoidal output voltage with a quasi-sinusoidal wave form having peak values nearer to the peak of the nominal AC input voltage.

In a first order approximation, the buck/boost capability of an APLC is dependent on the ratio of the DC link voltage $V_{DC}$ to the peak value of the nominal AC input voltage. Thus, peak voltage regulation may be improved according to the invention by a temporary increase of $V_{DC}$ when excessive input voltage variations are encountered. The temporary increase of $V_{DC}$ allows the application of larger secondary voltages to secondary winding 23. The larger secondary voltages, in turn, result in a greater primary voltage across primary winding 22. Since the increased primary voltage, or AC regulation voltage, is inserted in series with AC input voltage $V_{in}$ to make up the output voltage of APLC 10, the resulting sum of the two voltages may achieve a higher peak level. Furthermore, transient spikes appearing in the AC input voltage may be rejected to a greater degree than would otherwise be the case. These results may generally be achieved by functions easily implemented within control 17. As a result, the overall size and cost of APLC 10 should be comparable to the prior art.

Figure 2:
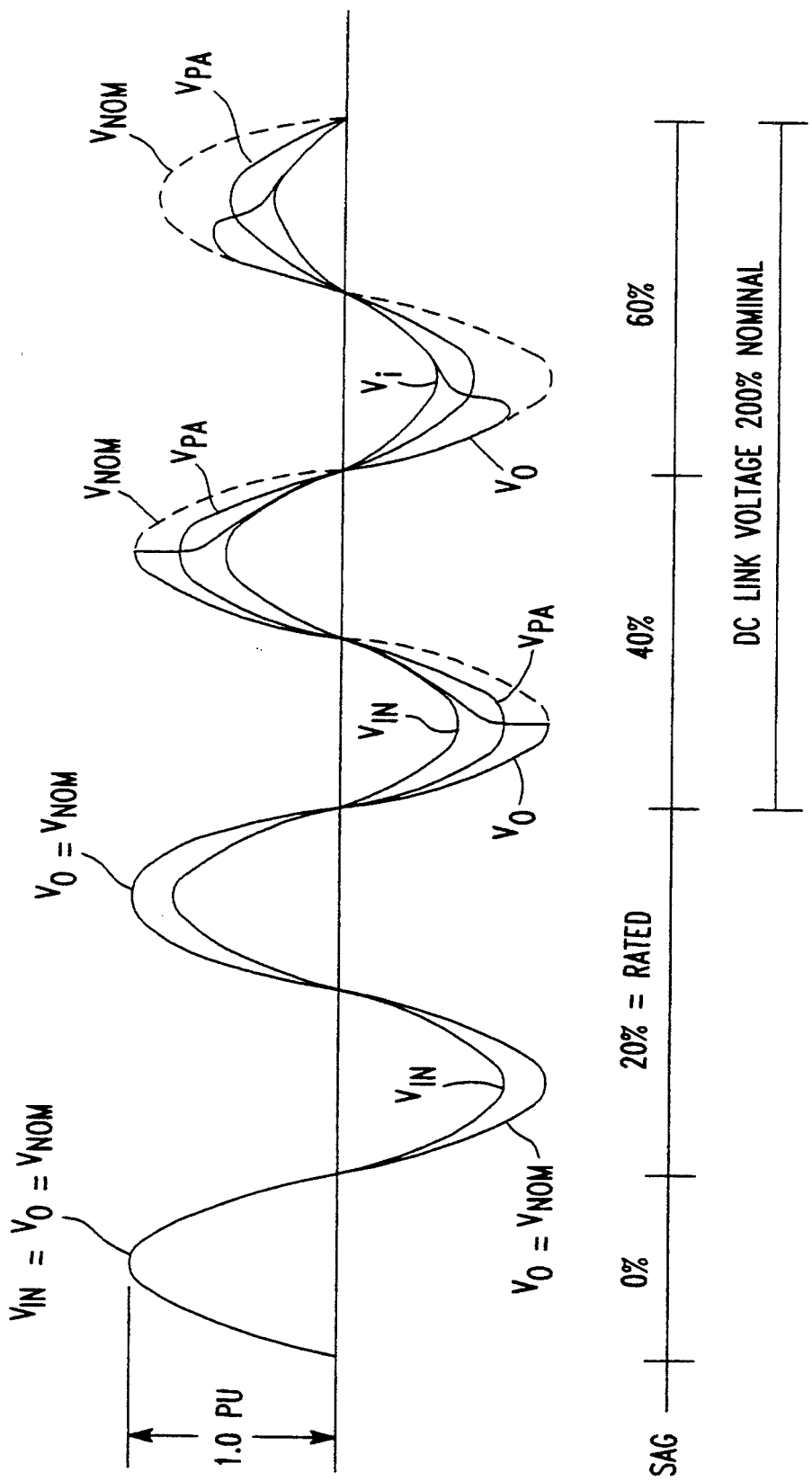
FIG. 2 is a plot of voltage regulation capability of the invention utilizing only a temporary increase in the DC link voltage in comparison with the prior art for various degrees of input voltage sag.

FIG. 2 graphically illustrates a hypothetical AC input voltage $V_{in}$ being regulated according to the prior art and the link energy boosting technique of the present invention. During the first half cycle, $V_{in}$ is equal to the nominal line voltage $V_{nom}$ at a value of one per unit (1.0 P.U.). Because $V_{in}$ is at desired value, AC output voltage $V_o$ will also have this value without the aid of boosting action by series inverter 14. During the second and third half cycles, however, it can be that $V_{in}$ has sagged to a level 20% below $V_{nom}$. Assuming that APLC 10 has a linear regulation range of 20%, series inverter 14 will be capable of providing just enough AC regulation voltage across primary winding 22 to maintain $V_o$ at the 1.0 P.U. value of $V_{nom}$.

As discussed above, if, according to the devices of the prior art, the value of $V_{in}$ falls below the rated sinusoidal regulation range, $V_o$ will also sag with a value equal to the sagging $V_{in}$ plus the maximum voltage provided across winding 22. The consequences of $V_{in}$ falling below the sinusoidal regulation range of APLC 10 are illustrated in the last two full circles of FIG. 2 wherein $V_{in}$ is illustrated sagging 40% and 60%, respectively, of $V_{nom}$. According to the prior art, the output voltage $V_{pa}$ would track $V_{in}$ at a level 20% higher than $V_o$. As illustrated, however, a temporary boost in voltage across capacitor 16 allows an increase in the peak of the AC regulation voltage added to $V_{in}$. Thus $V_o$ will be able to attain a higher peak level.

Although the boosted link voltage allows the insertion of larger peak voltages, the volt-second capability of transformer 21 remains unchanged. Thus, transformer 21 is capable of providing sinusoidal voltage at the fundamental frequency only to the limits of the sinusoidal regulation range of APLC 10. As a result, the higher level of voltage $V_{DC}$ will cause saturation of core C prior to the completion of the voltage half cycle at the fundamental frequency. When core C saturates, the output voltage $V_o$ will fall to the level of $V_{in}$. The peak levels required by loads with rectified capacitive power supplies, however, are nevertheless achieved for a greater degree of input sag.

The disclosed link energy boosting technique effectively utilizes the relatively large (approximately 600 V), but otherwise unused and therefore "free" voltage rating of IGBT power switching devices which may typically be used in inverters 14 and 15. Because the voltage across capacitor 16 is preferably allowed to fall to its nominal level when $V_{in}$ returns to the 1.0 PU level of $V_{nom}$, steady state losses in APLC 10 are not significantly affected by the use of this technique. A relatively small cost increase of APLC 10 when compared with the prior art may result from the incremental cost of higher voltage rated electrolytic capacitors which may be required in the DC link.

Figure 3:
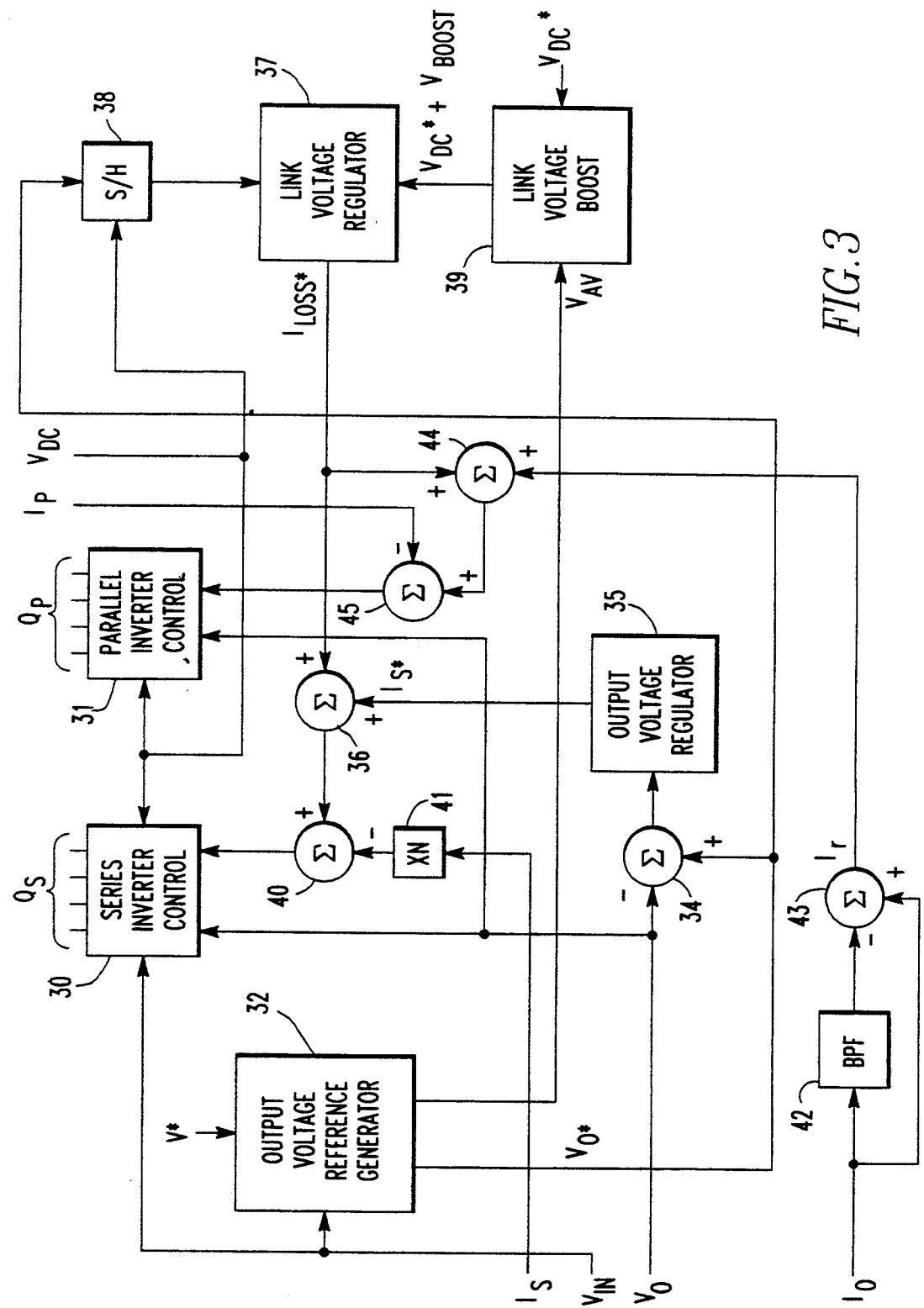
FIG. 3 is a diagrammatic representation of a presently preferred control scheme for use with the active power line conditioner of FIG. 1.

A diagrammatic representation of control 17 incorporating circuitry to effect link voltage boosting is illustrated in FIG. 3. Other than the addition of this circuitry, control 17 functions in a manner similar to the prior art. Pulse width modulated controllers 30 and 31 provide getting signals $Q_s$ and $Q_p$ to switch inverters 14 and 15, respectively. In order to determine the amount of buck or boost of voltage $V_{in}$ which is necessary, controller 30 receives input signals representative of both $V_{in}$ and $V_o$. An output voltage reference generator 32 receives inputs representative of $V_{in}$ and a reference voltage $V*$ and produces an output voltage reference signal $V_o*$. Phase locked loops or unity output voltage band pass filers may be utilized by output voltage reference generator 32 to produce output voltage reference signal $V_o*$. Reference signal $V_o*$ is a sinusoidal signal having an amplitude of 1.0 P.U. and is normally in phase with voltage $V_{in}$. Output voltage reference generator 32 also produces a signal $V_{AV}$ representative of the average value of voltage $V_{in}$.

Signal $V_o*$ is then subtracted from the measured value of $V_o$ at summing junction 34. The difference signal thus produced is fed to output voltage regulator 35. Output voltage regulator 35, which may be a proportional-integral (PI) regulator, produces a series inverter current reference signal $I_s*$.

Series current reference signal $I_s*$ is added at summing junction 36 to a signal $I_{loss}$ representing energy which must be added to the DC link to account for losses in the inverter. Inputs to link voltage regulator 37 are provided by sample and hold (S/H) device 38 and link voltage boost circuitry 39. S/H device 38 receives an input signal $V_{DC}$ representative of the measured voltage across capacitor 16. Signal $V_{DC}$ is also fed to controllers 30 and 31 for the purpose of linearizing the PWM action. As can be seen, S/H device 38 further receives signal $V_o*$. The output signal of S/H device 38 therefore represents a rippleless feedback signal even in the presence of voltage harmonics superimposed on the DC link voltage.

Link voltage boost circuitry 39 receives a reference signal $V_{DC}*$ which represents the nominal voltage level across capacitor 16. If APLC 10 is operating in its sinusoidal regulation range, this signal is passed faithfully to link voltage regulator 37. If, however, APLC 10 is not operating in its sinusoidal regulation range, link voltage boost circuitry 39 augments $V_{DC}*$ by an amount of boost by which the link voltage is to be increased. The output of summing junction 36 is then fed to summing junction 40, where it is subtracted from a measured value of the series inverter current $I_s$ (which has been multiplied at multiplier 41 by a factor N equal to the ratio of the greater number of turns in secondary winding 23 of transformer 21 with respect to primary winding 22). The error signal thus produced is then fed to controller 30.

Controller 31 receives an input representative of the measured value of voltage $V_o$ and a current demand signal which is the sum of various currents to be supplied by parallel inverter 15. To produce a demand signal for one of these currents, a measured value of the output current $I_o$ is passed through a bandpass filter (BPF) 42 to obtain the fundamental current. This fundamental current is then subtracted from the output current $I_o$ at summing junction 43 to obtain a ripple current signal $I_r$. Ripple current signal $I_r$ is then added to $I_{loss}*$ at summing junction 44. A signal representative of the measured value of the parallel inverter current $I_p$ is then subtracted from the output of summing junction 44 at sunning junction 45. It is this output of summing junction 45 which is fed to controller 31.

Figure 4:
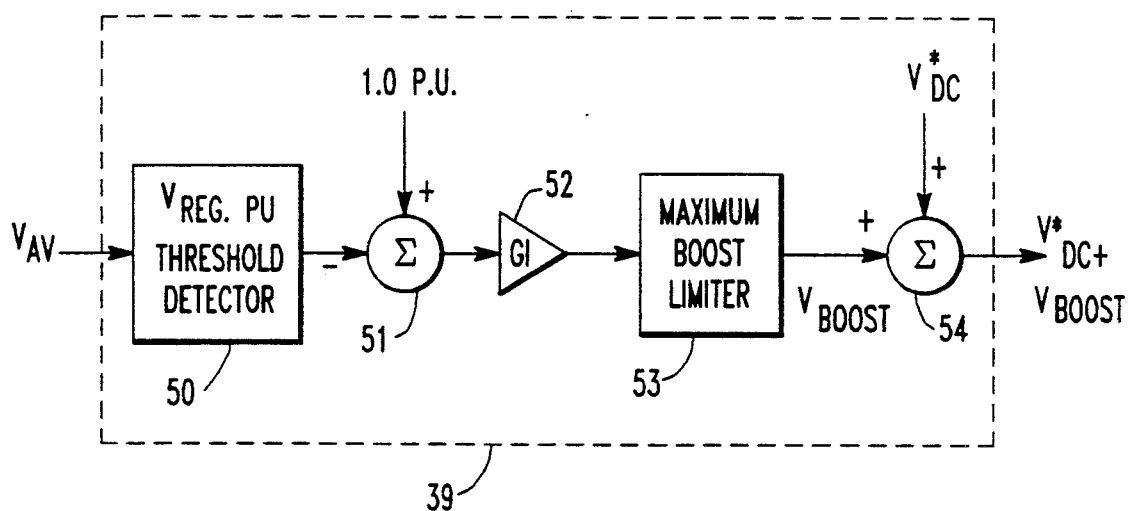
FIG. 4 is a diagrammatic representation of presently preferred means for temporarily increasing the DC link voltage when the AC input voltage is not within the sinusoidal regulation range of the active power line conditioner of FIG. 1.

A presently preferred embodiment of link voltage boost circuitry 39 is illustrated in FIG. 4. As shown, signal $V_{AV}$ is first fed to a $V_{REG}$ PU threshold detector 50. If the value of signal $V_{AV}$ is within the sinusoidal regulation range of APLC 10, then the output of detector 50 will be maintained at unity (1.0 PU) magnitude. If the value of $V_{AV}$ is not within the sinusoidal regulation range of APLC 10, the output of detector 50 will track $V_{AV}$ with an offset equal to the sinusoidal voltage regulation range. For example in per unit terms, a 20% sinusoidal regulation range translates into a value $V_{REG}$ equal to 0.2 PU. If the value of $V_{AV}$ sags 40%, the output of detector 50 becomes 0.6 plus 0.2, which equals 0.8 PU.

It can thus be seen that, only when the value of signal $V_{AV}$ is not within the sinusoidal regulation range of APLC 10 will the output of summing junction 51 be greater than zero. Therefore, the signal produced at the output of summing junction 51 will represent an amount by which $V_{in}$ is outside of this range. This signal is then passed through an amplifier 52 having a gain G1. In presently preferred embodiments, maximum energy boost in the DC link will be achieved when $V_{in}$ has deviated from $V_{nom}$ by an amount double the sinusoidal regulation range. Therefore, gain G1 may be equal to the reciprocal of $V_{REG}$ in per unit terms. Thus, if $V_{REG}$ is equal to 0.2, gain G1 preferably has a value of 5.0. The output of amplifier 52 is fed to a maximum boost limiter 53 to produce signal $V_{BOOST}$. Signal $V_{BOOST}$ is added to the DC link voltage reference signal $V_{DC}*$ at summing junction 54. The output of summing junction 54 is fed to link voltage regulator 37 as shown in FIG. 3.

It can thus be seen that the present invention provides an improved active power line conditioner which offers enhanced peak voltage regulation than similarly-sized devices of the prior art. While presently preferred embodiments of the invention and presently preferred methods of practicing the same have been described and illustrated, it is to be distinctly understood that the invention is not limited thereto but may be otherwise variously embodied and practiced within the scope of the following claims.

I claim:
1. An active power line conditioner for electrical connection interposing an electrical energy source and an electrical load, said active power line conditioner comprising:
   series inverter means for electrical coupling to said electrical energy source to selectively provide an AC regulation voltage in series with an AC input voltage supplied by said electrical energy source;
   parallel inverter means for electrical coupling across said electrical load to selectively source and sink electrical current;
   a DC energy storage element electrically connected between said series inverter means and said parallel inverter means;
   control means for controlling said series inverter means and said parallel inverter means to regulate an AC output voltage across said electrical load during variations of said AC input voltage;
   said control means operative to maintain DC energy in said electrical energy storage element at a nominal DC energy level when said variations of said AC input voltage are within a sinusoidal regulation range of said active power line conditioner; and
   said control means further having link energy boosting means for increasing DC energy in said electrical energy storage element above said nominal DC energy level when variations of said AC input voltage are not within said sinusoidal regulation range of said active power line conditioner.

2. The active power line conditioner of claim 1 wherein said link energy boosting means is generally operative to proportionally increase the DC energy in said electrical energy storage element based on an amount by which said AC input voltage is not within said sinusoidal regulation range of said active power line conditioner.

3. The active power line conditioner of claim 2 wherein said link energy boosting means is operative to limit increases of the DC energy stored in said DC energy storage element to a preselected maximum energy level.

4. The active power line conditioner of claim 3 wherein said preselected maximum energy level is achieved when said AC input voltage sags below a nominal value of said AC input voltage by a percentage amount twice that which may be regulated within said sinusoidal regulation range of said active power line conditioner.

5. The active power line conditioner of claim 1 wherein said DC energy storage element is a capacitive element and said link energy boosting means is operative to increase a DC voltage across said capacitive element by an amount generally up to twice a nominal DC voltage level across said capacitive element.

6. The active power line conditioner of claim 1 wherein said link energy boosting means comprises:
   means for determining an average value of said AC input voltage;
   means for determining whether said average value of said AC input voltage is not within said sinusoidal regulation range of said active power line conditioner; and means operative when said average value of said AC input voltage is not within the sinusoidal regulation range of said active power line conditioner to produce a DC energy level reference representative of a selected increase of DC energy in said DC energy storage element above said nominal DC energy level.

7. A method of regulating AC line voltage at a nominal value in an electrical distribution network including an AC source supplying an electrical load, said method comprising:
(a) providing a transformer having a primary winding and a secondary winding;
(b) serially connecting said primary winding of said transformer between said AC source and said electrical load;
(c) connecting said secondary winding to AC terminals of a series inverter circuit;
(d) sensing a voltage supplied by said AC source;
(e) applying a generally constant nominal DC energy level to DC terminals of said series inverter circuit when the AC supply voltage is within a preselected range;
(f) applying an increased DC energy level greater than said nominal energy level to DC terminals of said series inverter circuit when the AC supply voltage is not within said preselected range; and
(g) controlling said series inverter circuit to apply an AC secondary voltage across said secondary winding to induce an AC regulation voltage on said primary winding.

8. The method of claim 7 wherein said increased DC energy level exceeds said nominal DC energy level by an amount proportional to an amount by which said AC line voltage is not within said preselected range.

9. The method of claim 8 wherein said increased DC energy level is not further increased above an energy level generally equal to twice said nominal DC energy level.

* * * * *